March 22, 1966  G. STRÖKER  3,241,693
LOADING ARRANGEMENT
Filed Dec. 24, 1962  3 Sheets-Sheet 1

Inventor:
Günther Ströker
by Michael S. Striker
Atty

March 22, 1966 G. STRÖKER 3,241,693
LOADING ARRANGEMENT
Filed Dec. 24, 1962 3 Sheets-Sheet 2
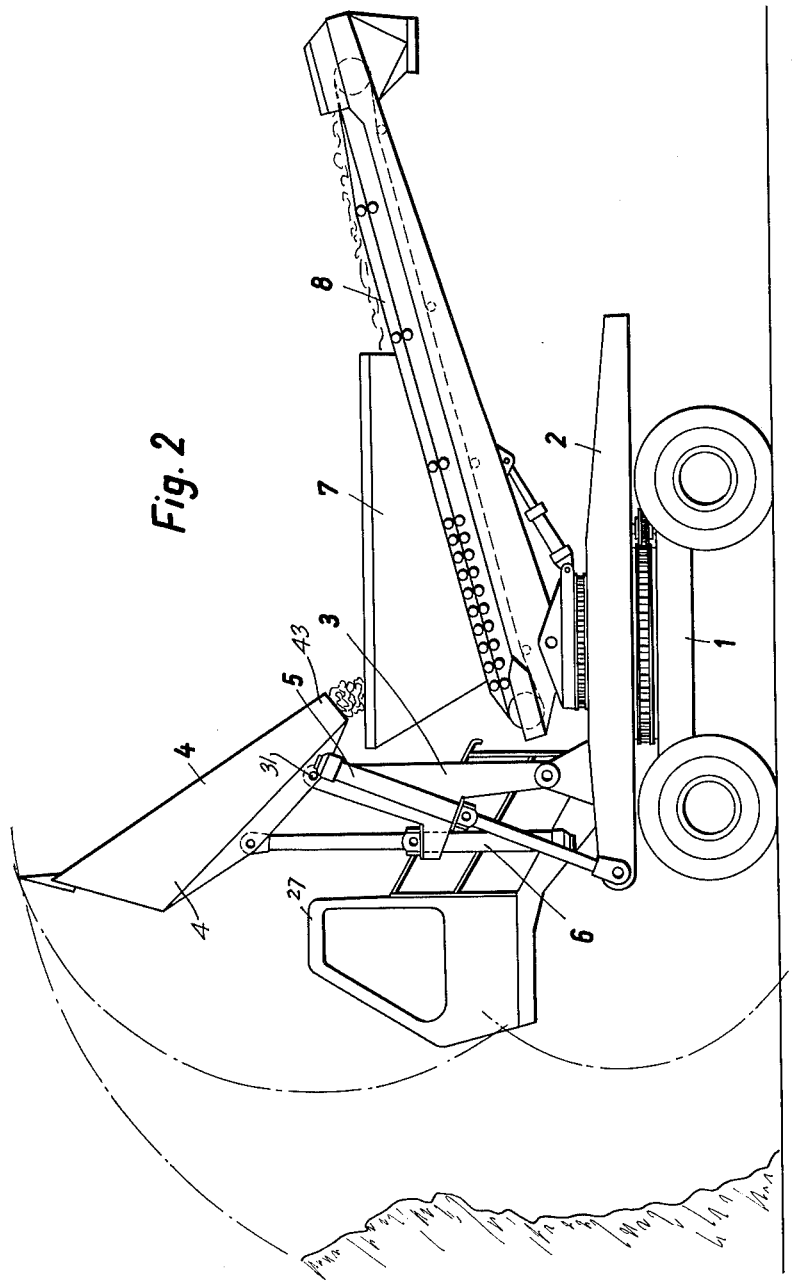
Inventor:
Günther Ströker
by Michael S. Striker
Atty March 22, 1966 G. STRÖKER 3,241,693
LOADING ARRANGEMENT
Filed Dec. 24, 1962 3 Sheets-Sheet 3
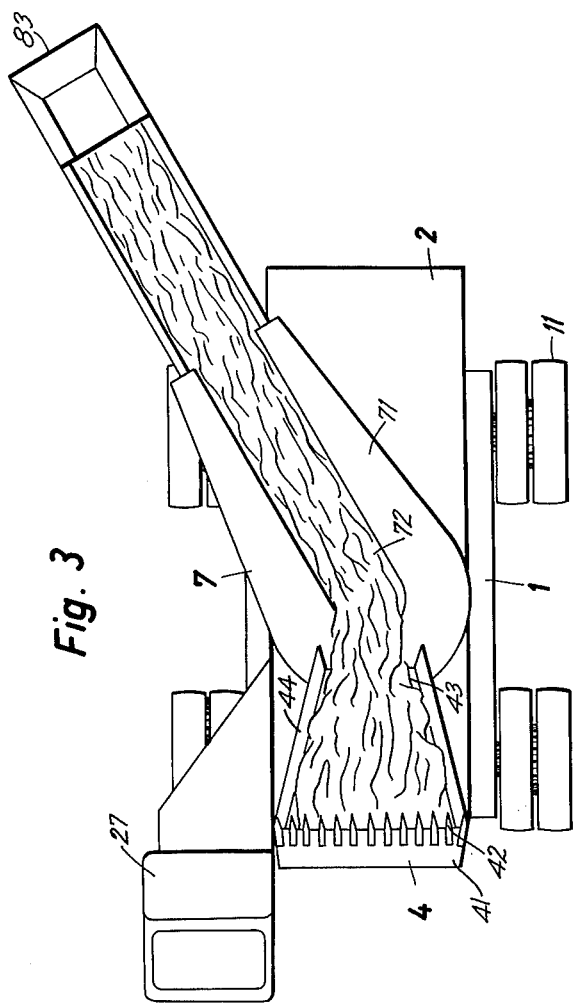
Inventor:
Günther Ströker
by Michael S. Striker
Atty

United States Patent Office 3,241,693
Patented Mar. 22, 1966

3,241,693
LOADING ARRANGEMENT
Günther Ströker, Schueren, Germany, assignor to Firma Gustav Schade, Dortmund-Schueren, Germany
Filed Dec. 24, 1962, Ser. No. 246,803
8 Claims. (Cl. 214—90)

The present invention relates to a loading arrangement, and more particularly to a loading arrangement of the type in which a material is scooped up and deposited on a conveyor which discharges the material onto a truck so that the same is loaded with the material.

For the loading of material such as sand, ore, coal, salt, earth on trucks, freight cars, and conveyor bands, different types of loading apparatus are used. The material may be scooped up or gripped by a shovel means, which is moved to the location where the material is to be discharged, whereupon the shovel means has to return on the same way to the operative position where material can be scooped up. Since the position of the discharge point varies, the sequence of motions and the time required for each operation depends on the skill of the operator.

Other known loading apparatus requires the operator to drive a vehicle carrying the shovel against the piled up material so that the shovel is loaded. The shovel is then raised for discharge, whereupon the vehicle moves back and again forward for ramming the shovel again into the piled up material.

All known loading arrangements have the disadvantage that the point of discharge cannot be clearly observed by the operator so that a cautious and consequently slow operation is necessary. Another disadvantage resides therein in that idle motions of the vehicle and of the shovel ar required which reduce the efficiency and the output of the loading apparatus. Furthermore, the scooped up material is made to drop from the shovel onto the loaded truck or freight car, causing great wear.

It is the object of the present invention to overcome these disadvantages of the prior art, and to provide a loading arrangement which scoops up material at a first point, and deposits the material at a second point without requiring a movement of the vehicle carrying the loading arrangement.

Another object of the present invention is to provide a loading arrangement which does not require great skill of the operator while continuously loading a scooped up material at a desired location.

Another object of the present invention is to provide independent means for operating the shovel or scoop of the loading arrangement at a desired point where the material is located, and other independent means for discharging the scooped up material at a desired location.

Another object of the present invention is to provide a shovel having a scoop portion for scooping up a material, and a chute portion for slidingly discharging the material when the shovel is raised to a higher position.

Another object of the present invention is to mount the shovel for turning movement about a vertical axis, and to place a conveyor in the region of the vertical turning axis so that, irrespective of the position of this shovel, the scooped up material is discharged on the conveyor.

With these objects in view, one embodiment of the invention relates to a loading arrangement which comprises a movable first support, such as a vehicle, a second support mounted on the vehicle for turning movement about a vertical axis, and shovel means mounted on the second support for movement with the same about the vertical axis, and for movement relative to the same between a lower position for scooping up a material, and a higher position located above the supports.

The shovel means is movable in a substantially horizontal direction when in the lower position, and is actuated by suitable operating means to scoop up the material in the lower position. Other operating means raise the shovel means to the higher position, and effect turning of the shovel means to a position in which a chute portion of the shovel means slidingly discharges scooped up material in the region of the vertical turning axis.

Preferably, a hopper is located in the region of the vertical turning axis, and consequently receives the material discharged from the chute portion of the shovel means irrespective of the turned position of the second support and of the shovel means. A conveyor means is located underneath the hopper means, and is turnable about the vertical axis, so that material deposited through the hopper means on the convyeor means can be discharged at locations selected by turning the conveyor means about the vertical axis thereof.

In the preferred embodiment, the conveyor means is also turnable about a horizontal axis, so that its discharge end can be raised.

Since the shovel means can be operated to scoop up material while the vehicle is at a standstill, no movement toward and away from the material is required of the vehicle. Furthermore, since the location at which the material is discharged can be selected by turning the conveyor means, it is not necessary to move the vehicle to the location at which the material is to be discharged.

When the support is turned on the vehicle about the vertical axis, the shovel means moves along a segment of a circle, which may extend through 180°. In this manner, the point of the piled up material against which the shovel means is driven to scoop up the material, can be selected, while the point of discharge can be maintained by holding the conveyor means in the same position. On the other hand, the scoop may be repeatedly operated at the same point of the piled up material, while the place of discharge can be selected by turning the conveyor means about its vertical axis.

As explained above, the raising of the shovel to the higher position results in automatic discharge from the shovel since the material slides out of the chute portion, so that no reversal of the shovel, or opening of the shovel, is required for the discharge of the material. Since material slides out of the chute portion as the shovel is gradually raised to a more steeply inclined position, the material is gradually discharged from the shovel, which is an advantage as compared with shovels from which the entire contents are dropped by reversing or opening the shovel in its highest position. The gradual sliding discharge from the shovel in accordance with the present invention reduces the impact of the discharged material on the hopper or conveyor in accordance with the present invention, or on a truck or freight car, if the shovel is directly discharged on the car to be loaded.

The only operation to be carried out by the operator is the filling of the shovel, while the raising of the shovel, the discharge of the material from the shovel, and the discharge from the conveyor on the car to be loaded requires no attention or skill of the operator.

As compared with the loading arrangements according to the prior art, the efficiency is substantially increased, since idle motions are avoided, and only small masses are moved through short distances.

Due to the fact that the shovel can be operated over a very wide area, the vehicle on which the loading arrangement is mounted need not be moved for several hours of loading operations.

The vehicle on which the loading apparatus is mounted may be driven onto supporting plates and remain on the same during the operations. Since movement of the vehicle is unnecessary, the wear and tear of the vehicle is substantially reduced, and moreover, since the vehicle need not drive over the material to be loaded, disintegration of the material by the tires of the vehicle driving on the same is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a side elevation of the loading arrangement with the shovel in raised position for discharge of scooped up material; and FIG. 3 is a plan view of the loading arrangement in the position of FIG. 2, but showing the conveyor means in a turned position.

Figure 1:
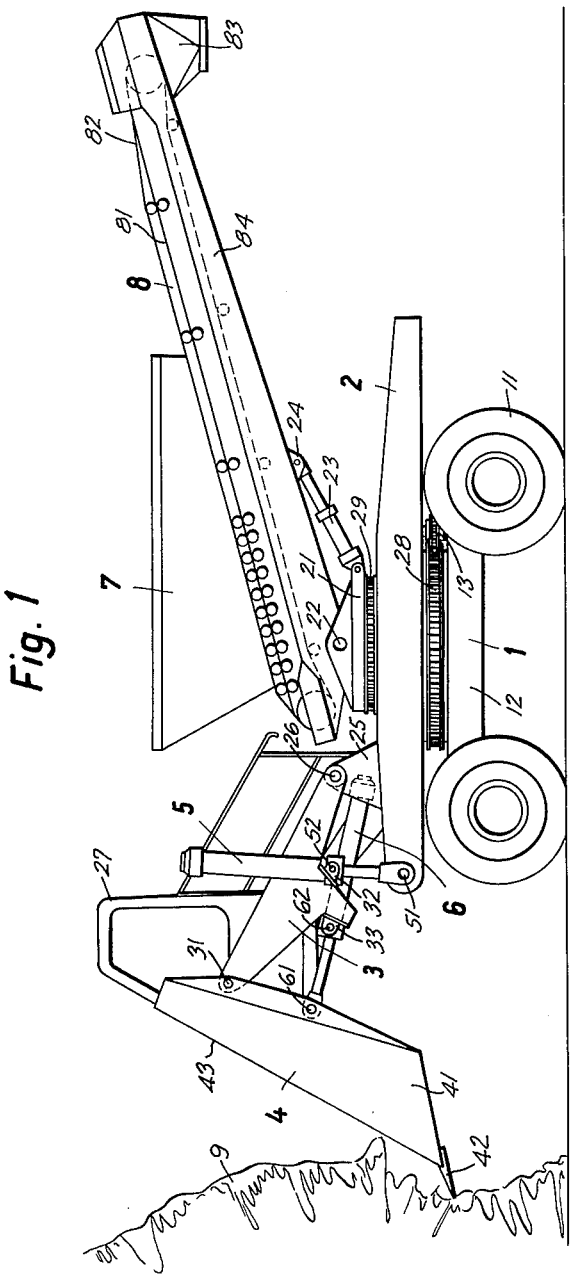
FIG. 1 is a side elevation of a loading arrangement in accordance with the present invention with the shovel in operating position.

Referring now to the drawings, a vericle 1 includes wheels 11 and a first support 12 on which a second support 2 is mounted for turning movement about a vertical axis. A gear 28 is secured to support 2 concentric with the turning axis of the same, and is rotated by a drive pinion 13 for turning support 2. A support member 21 is mounted on support 2 for turning movement about a vertical axis coinciding with the turning axis of support 2 and gear 28 and has a gear means 29 which is engaged by another drive pinion, not shown, so that support member 21 can be turned about its vertical axis independently of the turning movement of support 2.

A horizontal shaft 22 supports one end of a conveyor means 8 for turning movement so that the other end of conveyor means 8 can be raised.

Conveyor means 8 includes an endless conveyor band 81 which is moved by drive means, not shown, so that the upper run of conveyor band 81 moves toward the discharge member 83 which has a downwardly directed tubular discharge outlet.

A hopper means 7 is mounted on the casing 84 of the conveyor means, and has a downwardly converging U-shaped lateral wall, and a top wall 71 formed with an elongated opening 72, as best seen in FIG. 3.

The left end of opening 72 is located in the region of the vertical turning axis of support 2, and of the vertical turning axis of support member 21.

A cab 27 for the operator is modified on one side of the turnable support 2, and turns with the same.

A lever means 3 is mounted on brackets 25 of support 2 for turning movement about the horizontal shaft 26 and has the end thereof connected by a pivot means to the rear portion of a shovel or scoop 4. Lever means 3 has bracket means 32 supporting a pivot pin 52 connected to the cylinder of a hydraulic servo motor 5, whose piston is pivotally connected at 51 to support 2.

Another bracket means 33 on lever 3 supports, another pivot pin 62 connected to the cylinder of another hydraulic servo motor 6 whose piston means is connected by a pivot means 61 to shovel 4.

Shovel 4 has a forwardly located scoop portion 41 with a scoopedge provided with spikes 42 and a rearwardly located chute portion 43 which is bounded by converging lateral walls 44 forming a discharge opening in the rear portion of the shovel or scoop 4.

Members 3, 4, 5, and 6 form a lever system, and the operator can move the shovel means 4 between several positions by operation of the hydraulic servo motor means 5 and 6.

The manually controlled means by which the servo motors 5 and 6 are actuated by supply or discharge of pressure fluid to the cylinders are well known, and therefore not illustrated. A source of pressure fluid may communicate through conduits with the cylinders of the hydraulic servo motors 5 and 6, and the admission or discharge of the fluid may be controlled by manually operated valves, not shown.

A hydraulic servo motor 23 is pivotally connected to the turnable support member 29, and has a piston member connected by a pivot means 24. When servo motor means 23 is operated in conventional manner, as described above, conveyor means 8 is turned about shaft 22 so that the discharge end 82 with discharge member 83 is raised.

The operator also controls means, not shown for rotating the drive pinion 13, and the other drive pinion, not shown, for rotating gear 29 with support member 21.

In the position shown in FIG. 1, shovel 4 is in a lower position in which its scoop portion 41 with the row of pointed elements 42 is located opposite the material 9. When the turnable support 2 is turned about its vertical axis, the scoop portion 41 will swing along a circular path which may extend through 180° so that the shovel 4 can be located opposite different parts of the piled up material 9 without moving the vehicle 1.

When servo motor 6 is actuated in the lower position of shovel or scoop 4 shown in FIG. 1, the shovel will turn about pivot means 31 and scoop portion 41 will move forwardly in a substantially horizontal direction and dig into the material 9 until the scoop portion 41 is first filled with material, and then raised so that shovel 4 assumes an almost horizontal position. Operation of servo motor 5 will effect turning movement of lever means 3 in clockwise direction about pivot means 26 so that shovel 4 is raised to the higher position shown in FIG. 2. At the same time, servo motor 6 is further operated to raise the scoop portion 41 above the pivot means 31 so that the chute portion 43 is located below pivot means 31 and is downwardly inclined to discharge the scooped up material into the opening 72 of hopper 7.

In the higher position illustrated in FIG. 2, the chute portion 43 of shovel 4 is located in the region of the vertical turning axis of support 2, and of conveyor means 8 with hopper 7. Consequently, when support 2 is turned to place the shovel or scoop 4 opposite other parts of the piled up material 9, the chute portion 43 will nevertheless be located above the left end of opening 72 of hopper 7, and also above the receiving end of the conveyor band 81.

As explained above, conveyor 8 can also be turned together with supporting member 21 while support 2 remains in the same position. A turned position of conveyor means 8 is shown in FIG. 3, and the discharge portion 83 of conveyor means 8 is assumed to be located above the platform of a truck or freight car to be loaded. It is evident that any turned position of the conveyor means 8 may be selected in accordance with the relative position between the vehicle 1 and the truck or freight car to be loaded. However, in all turned positions of conveyor means 8, the opening 72 will be located underneath the chute portion 43 of shovel 4 when shovel 4 is in the higher position shown in FIG. 2. This is due to the fact that the outlet of the chute portion 43 is located in the region of the vertical axis about which conveyor means 8 turns.

If the platform of the truck or freight car to be loaded is high, conveyor means 8 is turned about shaft 22 to a position in which its discharge end portion 83 is sufficiently high.

The loading arrangement is operated in the following manner: The vehicle 1 is pulled or pushed, or driven by its own motor, not shown, to a position located near a pile of material 9 and a truck, freight car, or conveyor means to be loaded. While the vehicle is moved, the shovel 4 may be in the higher position. Before the operation, however, shovel 4 is lowered to the position of FIG. 1. Conveyor means 8 is turned by operation of servo motor 23 until its discharge member 83 is located sufficiently high above a truck or freight car, whereupon supporting member 21 is rotated with conveyor means 8 and hopper 7 until the discharge member 83 is located directly over the truck or freight car.

Thereupon, the operator actuates the operating means 6 and 5 to scoop up material. While the shovel is turned by servo motor 6 about pivot 31, servo motor 5 lowers lever 3 so that the scoop edge with spikes 24 moves in a horizontal direction into the material 9. Servo motor 5 raises the shovel, and servo motor 6 turns the shovel in its higher position about pivot 31 so that the scooped up material gradually slides out of chute portion 43 into hopper 7 and from there onto the receiving end of the conveyor band 81 on which it is transported to the discharge end 82 to pass out of the discharge member 83.

When the respective part of the pile has been loaded in this manner, support 2 is turned by operation of drive pinion 13 so that shovel 4 is located opposite another part of the pile 9 in its lower position, and can deposit scooped up material in hopper 7 so that the material is loaded by conveyor 8.

This operation can be continued without moving vehicle 1, and without turning conveyor means 8 about its vertical or horizontal axes.

The operator need only observe the scooping operation in the lower position of the shovel, and needs no skill for depositing the material in the hopper 7, since the chute portion 43 will automatically discharge the material into the hopper when the shovel is moved to its highest position shown in FIG. 2 by expanding servo motors 5 and 6 to the maximum limit. As explained above, even if support 2 with lever means 3 and shovel 4 is turned, the shovel will nevertheless discharge the scooped up material precisely into the opening of the hopper.

The receiving means 7, 8 for the scooped up material may be replaced by a storage container having a discharge outlet, and a top opening located in the region of the vertical turning axis of support 2, and underneath the chute portion 43 in the higher position of shovel 4.

Expansible supporting legs may be provided on support 1 to relieve the wheels of the load during continuous operations.

Means may be provided to lock and support conveyor means 8 in its operative positions turned about shaft 22 and about the vertical axis of support member 21. From the above description it will become apparent that the loading arrangement of the present invention may remain in the same place for many hours of work without requiring movement of any parts except the shovel and the operating means therefor.

It will be understood that each of the elements described above, or two or more together, may also find a useful application in other types of loading arrangements differing from the types described above.

While the invention has been illustrated and described as embodied in loading apparatus including a shovel having a chute portion for discharging scooped up material onto receiving and conveying means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A loading arrangement comprising, in combination, a vehicle having a ground engaging portion; a support mounted on said vehicle and having a forward end portion; a material receiving means on said support located rearwardly from said forward end portion; lever means mounted on said support for turning movement about a first horizontal axis located in the region of said forward end portion of said support; shovel means having a scoop edge at one end and a discharging portion at the other end; pivot means for mounting said shovel means on said lever means for turning movement about a second axis parallel to said first axis, the distance between said second axis and said scoop edge being at least as great as the distance between said first axis and said ground engaging portion of said vehicle; first operating means mounted on said support and connected to said lever for turning the same about said first axis so that said shovel means can be moved between a lower working position and a higher discharge position in both of which positions said second axis is located at least as high as said first axis; and second operating means connected to said lever means and to said shovel means for turning the latter about said second axis, so that said shovel means can be turned about said pivot means in said lower position thereof while said first operating means lowers said lever means in such a manner that said scoop edge moves along a substantially horizontal path in a direction away from said vehicle for digging into a material without a movement of said vehicle, and for turning said shovel means in said higher position to discharge material from said discharging portion of said shovel means onto said material receiving means.

2. A loading arrangement as set forth in claim 1, wherein said first operating means include a first expansible and contractible servo motor having one end pivotally connected to said support and the other end pivotally connected to said lever means, and wherein said second operating means includes a second expansible and contractible servo motor having one end pivotally connected to said lever means and the other end pivotally connected to said shovel means.

3. A loading arrangement as set forth in claim 1, wherein said support is mounted on said vehicle about a vertical axis, said receiving means being located in the region of said vertical axis and said discharging portion of said shovel means being located, in the higher discharge position of the latter, substantially in said vertical axis above said receiving means whereby material may be discharged from said discharging portion of said shovel means onto said receiving means in all turned positions of said support.

4. A loading arrangement as set forth in claim 3, further comprising a second support above said support, said second support mounted for independent turning movement about said vertical axis; a conveyor mounted on said second support and having a receiving end within the region of said vertical axis and a discharge end adapted to project from said vehicle, said receiving end constituting at least a part of said receiving means, and said discharge end of said conveyor moving about a circular path during turning of said second support, whereby material discharged from said discharging portion of said shovel means, when the latter is in said higher discharge position thereof, is discharged into said receiving end of said conveyor in all turned positions of said first mentioned support and said second support.

5. An arrangement as set forth in claim 4, wherein said reeciving means further comprises a hopper located in the region of said vertical axis above said receiving end of said conveyor and under said discharging portion of said shovel means in said higher discharge position of the latter, and wherein said conveyor is mounted on said second support for turning about a horizontal axis crossing said vertical axis.

6. A loading arrangement as set forth in claim 5 wherein said hopper has a downwardly tapering lateral wall and a top wall formed with an elongated opening extending along said conveyor and having a portion located in the region of said vertical axis, said discharging portion of said shovel means including a chute portion having lateral converging walls forming a discharge opening at the end of said chute portion located above said portion of said elongated opening which is located in the region of said vertical axis.

7. A loading arrangement as set forth in claim 1 wherein said scoop edge of said shovel means has a row of pointed elements adapted to dig into a material.

8. A loading arrangement as set forth in claim 1, wherein said first operating means comprises first expansible and contractible hydraulic operating means mounted on said support and extending in a substantally vertical direction and connected to said lever means for turning the same about said first axis, and wherein said second operating means comprises second expansible and contractible hydraulic operating means connected to said lever means and to said shovel means and extending in said lower position in a substantially horizontally direction transversely to said axis.

References Cited by the Examiner

UNITED STATES PATENTS

| | | | |
|---|---|---|---|
| 1,472,907 | 11/1923 | Gow | 214—132 |
| 2,279,529 | 4/1942 | Royle | 214—90 |
| 2,576,991 | 12/1951 | Bainbridge et al. | 198—99 X |
| 2,707,570 | 5/1955 | Biedess | 214—90 |
| 2,746,625 | 5/1956 | Schwartz et al. | 214—131 |
| 2,879,908 | 3/1959 | Andersen | 214—131 |
| 3,019,922 | 2/1962 | Webster | 214—140 |
| 3,029,961 | 4/1962 | Sagerer | 214—140 |
| 3,047,172 | 7/1962 | Ulinski | 214—140 |
| 3,096,893 | 7/1963 | Biedess | 214—90 |

FOREIGN PATENTS

| | | |
|---|---|---|
| 803,408 | 4/1951 | Germany. |

GERALD M. FORLENZA, *Primary Examiner.*

HUGO O. SCHULZ, *Examiner.*

J. W. DEWHIRST, *Assistant Examiner.*